US009294397B1

(12) United States Patent
Bishara et al.

(10) Patent No.: US 9,294,397 B1
(45) Date of Patent: Mar. 22, 2016

(54) APPARATUS AND METHOD FOR FORWARDING PACKETS BASED ON APPROVED ASSOCIATIONS BETWEEN PORTS AND ADDRESSES OF RECEIVED PACKETS

(71) Applicant: Marvell International Ltd., Hamilton (BM)

(72) Inventors: Nafea Bishara, San Jose, CA (US); Tsahi Daniel, Palo Alto, CA (US); David Melman, D.N. Bikat Beit Hakerem (IL)

(73) Assignees: Marvell Israel (M.I.S.L) Ltd., Yokneam (IL); Marvell International Ltd., Hamilton (BM)

( * ) Notice: Subject to any disclaimer, the term of this patent is extended or adjusted under 35 U.S.C. 154(b) by 240 days.

(21) Appl. No.: 13/920,577

(22) Filed: Jun. 18, 2013

Related U.S. Application Data

(63) Continuation of application No. 12/917,405, filed on Nov. 1, 2010, now Pat. No. 8,472,445, which is a continuation of application No. 10/761,879, filed on Jan. 21, 2004, now Pat. No. 7,826,452.

(60) Provisional application No. 60/457,262, filed on Mar. 24, 2003.

(51) Int. Cl.
*H04L 12/741* (2013.01)
(52) U.S. Cl.
CPC ..................................... *H04L 45/74* (2013.01)
(58) Field of Classification Search
CPC ............ H04L 12/28; H04J 3/02; G06F 13/38
See application file for complete search history.

(56) References Cited

U.S. PATENT DOCUMENTS

| | | | |
|---|---|---|---|
| 5,339,449 A | 8/1994 | Karger et al. | |
| 6,115,378 A * | 9/2000 | Hendel et al. | 370/392 |
| 6,438,129 B1 | 8/2002 | Jennings et al. | |
| 6,442,144 B1 | 8/2002 | Hansen et al. | |
| 6,529,507 B1 | 3/2003 | O'Malley et al. | |
| 6,535,498 B1 | 3/2003 | Larsson et al. | |
| 6,633,565 B1 | 10/2003 | Bronstein et al. | |
| 6,683,875 B1 | 1/2004 | Byham et al. | |
| 6,751,225 B1 | 6/2004 | Chung | |
| 6,763,023 B1 | 7/2004 | Gleeson et al. | |
| 6,912,592 B2 | 6/2005 | Yip | |

(Continued)

FOREIGN PATENT DOCUMENTS

EP      1 054 533      11/2000

*Primary Examiner* — Andrew Lai
*Assistant Examiner* — Leon Andrews

(57) ABSTRACT

A switch includes ports including a first port and a second port. A processor approves associations between the ports and addresses of packets. A memory stores entries having respective indicators indicating approval of an association between respective ports and addresses. The first port receives a first packet sent to the switch. The controller: determines whether one of the entries includes an address of the first packet; if none of the entries includes the address of the first packet, sends a first message to the processor requesting approval of the first packet; if one of the entries includes the address of the first packet, determines whether the indicator of the one of the entries indicates approval and based on this, sends the first message to the processor; receives a response from the processor based on the first message; and based on the response, forwards the first packet to the second port.

22 Claims, 4 Drawing Sheets

(56) References Cited

U.S. PATENT DOCUMENTS

| | | |
|---|---|---|
| 6,940,814 B1 | 9/2005 | Hoffman |
| 7,286,528 B1 | 10/2007 | Pannell |
| 7,443,856 B2 | 10/2008 | Lodha et al. |
| 2003/0142680 A1 | 7/2003 | Oguchi |
| 2004/0133619 A1 | 7/2004 | Zelig et al. |
| 2004/0215758 A1 | 10/2004 | Kompella et al. |
| 2005/0207414 A1 | 9/2005 | Duvvury |

* cited by examiner

APPARATUS AND METHOD FOR FORWARDING PACKETS BASED ON APPROVED ASSOCIATIONS BETWEEN PORTS AND ADDRESSES OF RECEIVED PACKETS

CROSS-REFERENCE TO RELATED APPLICATIONS

The present disclosure is a continuation of U.S. patent application Ser. No. 12/917,405 (now U.S. Pat. No. 8,472, 445), filed Nov. 1, 2010, which is a continuation of U.S. patent application Ser. No. 10/761,879 (now U.S. Pat. No. 7,826,452) filed Jan. 21, 2004, which claims the benefit of U.S. Provisional Patent Application Ser. No. 60/457,262 filed Mar. 24, 2003. The entire disclosures of the applications referenced above are incorporated herein by reference.

BACKGROUND

The present invention relates generally to data communication systems. More particularly, the present invention relates to address learning in data communication switches.

Self-routed packet data communication switches route packets according to addresses contained in the packets. For example, level-2 switches route each packet according to the destination media access control (MAC) address in the packet. Each switch comprises a forwarding database (FDB) that stores associations between MAC addresses and the ports of the switch. When a packet is received having with a particular destination MAC address, the switch transmits the packet through the port associated with the particular destination MAC address.

Some switches "learn" the FDB associations from the incoming packets. That is, when a packet is received with a particular source MAC address, the switch creates an association in the FDB between the particular source MAC address and the port on which the packet was received. That association is then used to route packets subsequently received by the switch with this MAC address as the destination.

For example, Ethernet switches that are compliant with the IEEE 802.1D-1998 specification are required to "learn" the FDB associations from the incoming packets. Learning can be automatic or controlled by a central processing unit (CPU). In either case the switch sends a notification message to the CPU each time the association between a MAC address and a port changes, for example when the switch receives a packet having a source MAC address that is not associated with a port, or when a MAC address associated with one port becomes associated with another port.

However, in controlled learning, the switch may receive many more packets having the new source MAC address, and therefore send many more notification messages to the CPU, before the CPU can respond to the first notification message. This plethora of unnecessary messages can burden the CPU unnecessarily, and can even provide an opportunity for a denial-of-service attack.

SUMMARY

A switch is provided and includes ports, a processor, a memory, and a controller. The ports include a first port and a second port. The processor is configured to approve associations between (i) the plurality of ports and (ii) addresses of packets. The memory is configured to store entries. Each of the entries has a respective indicator indicating approval or disapproval of an association between (i) one of the ports and (ii) one of the addresses of the packets. The first port is configured to receive a first packet sent to the switch. The controller is configured to: determine whether one of the entries includes an address of the first packet; if none of the entries includes the address of the first packet, send a first message to the processor requesting approval of the first packet; if one of the entries includes the address of the first packet, (i) determine whether the indicator of the one of the entries indicates approval, and (ii) based on whether the indicator of the one of the entries indicates approval, send the first message to the processor; receive a response from the processor based on the first message; and based on the response from the processor, forward the first packet to the second port.

In other features, a method is provided and includes approving, via a processor, associations between (i) ports of a switch and (ii) addresses of packets. The ports include a first port and a second port. Entries are stored in a memory. Each of the entries has a respective indicator indicating approval or disapproval of an association between (i) one of the ports and (ii) one of the addresses of the packets. A first packet sent to the switch is received at the first port. The method further includes determining whether one of the entries includes an address of the first packet. If none of the entries includes the address of the first packet, a first message is sent from a controller to the processor requesting approval of the first packet. The method further includes if one of the entries includes the address of the first packet, (i) determining whether the indicator of the one of the entries indicates approval, and (ii) based on whether the indicator of the one of the entries indicates approval, sending the first message from the controller to the processor. A response is received from the processor based on the first message. Based on the response from the processor, the first packet is forwarded to the second port.

In general, in one aspect, the invention features a method, apparatus, and computer-readable media for a switch comprising a plurality of network ports and a central processing unit (CPU) interface. It comprises receiving, on one of the network ports, a packet comprising a source media access control (MAC) address; sending, to the CPU interface, a request to approve an association between the one of the network ports and the source MAC address when no request to approve the association between the one of the network ports and the source MAC address has been sent to the CPU interface; and sending, to the CPU interface, the request to approve the association between the one of the network ports and the source MAC address when an association between the source MAC address and a different one of the network ports has been approved.

Particular implementations can include one or more of the following features. Implementations comprise determining whether an association exists between any of the network ports and the source MAC address. Determining whether an association exists between any of the network ports and the source MAC address comprises searching a forwarding database for the source MAC address. Implementations comprise determining whether no request to approve the association between the one of the network ports and the source MAC address has been sent to the CPU interface. Determining whether no request to approve the association between the one of the network ports and the source MAC address has been sent to the CPU interface comprises determining whether an unapproved association between the one of the network ports and the source MAC address exists. Determining whether the unapproved association between the one of the network ports and the source MAC address exists comprises determining whether the association between the one of the network ports and the source MAC address exists; and when the association between the one of the network ports and the source MAC address exists, determining whether the association between the one of the network ports and the source MAC address is approved. Determining whether the association between the one of the network ports and the source MAC address exists comprises searching a forwarding database for an entry comprising the source MAC address. Determining whether the association between the one of the network ports and the source MAC address is approved comprises determining whether an approval flag is set for the entry comprising the source MAC address. Implementations comprise creating an unapproved association between the one of the network ports and the source MAC address. Creating the unapproved association between the one of the network ports and the source MAC address comprises creating the association between the one of the network ports and the source MAC address; and marking the association between the one of the network ports and the source MAC address as unapproved. Creating the association between the one of the network ports and the source MAC address comprises creating an entry in a forwarding database, the entry identifying the one of the network ports and the source MAC address. Marking the association between the one of the network ports and the source MAC address as unapproved comprises setting an approval flag for the entry. Implementations comprise receiving, from the CPU interface, in response to the request to approve the association between the one of the network ports and the source MAC address, an approval of the association between the one of the network ports and the source MAC address; and clearing the approval flag for the entry. Implementations comprise receiving, from the CPU interface, in response to the request to approve the association between the one of the network ports and the source MAC address, a disapproval of the association between the one of the network orts and the source MAC address; and deleting the entry. Implementations comprise receiving, from the CPU interface, in response to the request to approve the association between the one of the network ports and the source MAC address, an approval of the association between the one of the network ports and the source MAC address; and approving the unapproved association between the one of the network ports and the source MAC address. Implementations comprise receiving, from the CPU interface, in response to the request to approve the association between the one of the network ports and the source MAC address, a disapproval of the association between the one of the network ports and the source MAC address; and deleting the unapproved association between the one of the network ports and the source MAC address. The packet further comprises a destination MAC address, and implementations comprise processing the packet according to the destination MAC address when an association between the destination MAC address and a further one of the network ports exists and the association between the destination MAC address and the further one of the network ports has been approved; and processing the packet without regard to the destination MAC address when no association between the destination MAC address and any of the network ports exists; and processing the packet without regard to the destination MAC address when the association between the destination MAC address and the further one of the network ports exists but the association between the destination MAC address and the further one of the network ports has not been approved. Processing the packet according to the destination MAC address comprises transmitting the packet from the further one of the network ports. Processing the packet without regard to the destination MAC address comprises transmitting the packet from all of the network ports but the one of the network ports.

The details of one or more implementations are set forth in the accompanying drawings and the description below. Other features will be apparent from the description and drawings, and from the claims.

Figure 1:
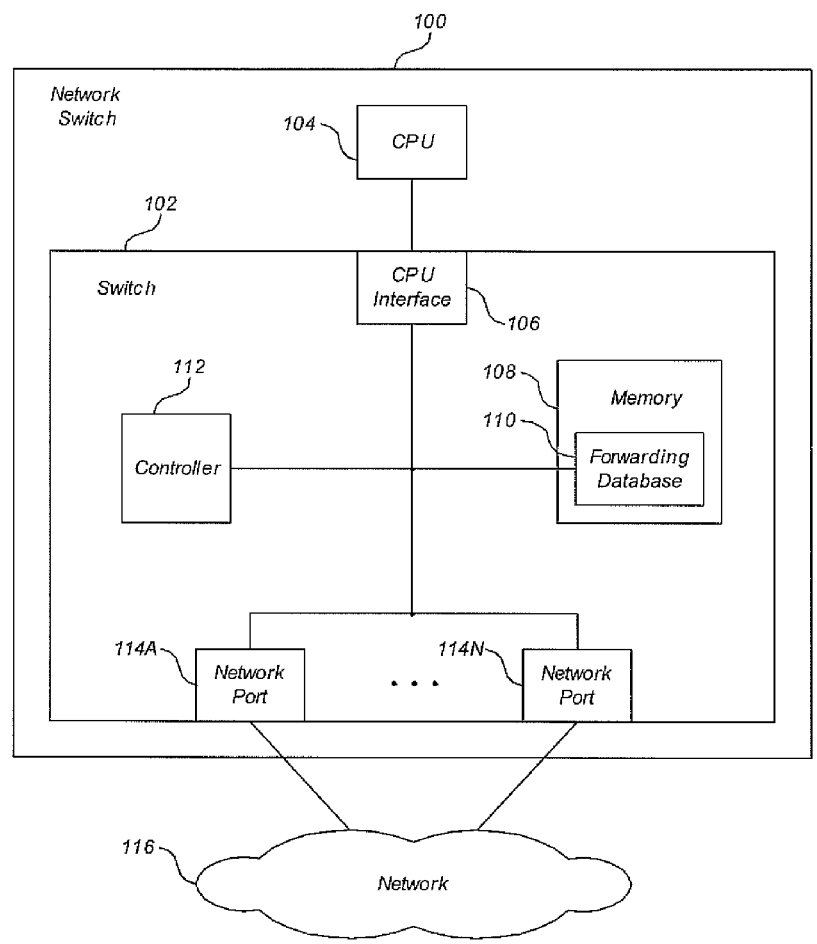
FIG. 1 shows a network switch according to a preferred embodiment of the present invention.

The leading digit(s) of each reference numeral used in this specification indicates the number of the drawing in which the reference numeral first appears.

DETAILED DESCRIPTION

Embodiments of the present invention employ techniques to ensure that, for each new source media access control (MAC) address encountered by a switch, only one notification message is sent to the central processing unit (CPU), thereby reducing traffic between the CPU and the switch, reducing the workload of the switch and CPU, and reducing the opportunities for denial-of-service attacks on the switch. In particular, embodiments of the present invention send a notification message for a new source MAC address to the CPU only when no such notification message has been sent. Embodiments of the present invention keep track of whether a notification message has been sent to the CPU by creating an association between the source MAC address and the port on which the packet was received. The association is marked unapproved until a message is received from the CPU in response to the notification message. No notification message is sent for an unapproved association, thereby ensuring that only one notification message is sent to the CPU for each new source MAC address.

Embodiments of the present invention create an association between a source MAC address and a port by storing an entry in the forwarding database (FDB) of the switch. The entry includes the source MAC address and the port identifier for the port. Embodiments of the present invention record whether such an association is approved using a flag for each such entry, referred to herein as the approval flag. When the approval flag for an entry is set, the entry is referred to as an unapproved entry. When the approval flag for an entry is clear, the entry is referred to as an approved entry. Only approved entries are used for bridging packets.

FIG. 1 shows a network switch 100 according to a preferred embodiment of the present invention. Network switch 100 comprises a switch 102, which can be fabricated as a single integrated circuit, and a central processing unit (CPU) 104. Switch 102 comprises a controller 112 and a CPU interface 106 to permit controller 112 to communicate with CPU 104. Switch 102 also comprises a plurality of network ports 114A through 114N for exchanging packets of data with a network 116 such as the Internet under the control of controller 112 and according to the contents of a forwarding database (FDB) 110 stored in a memory 108.

Figure 2:
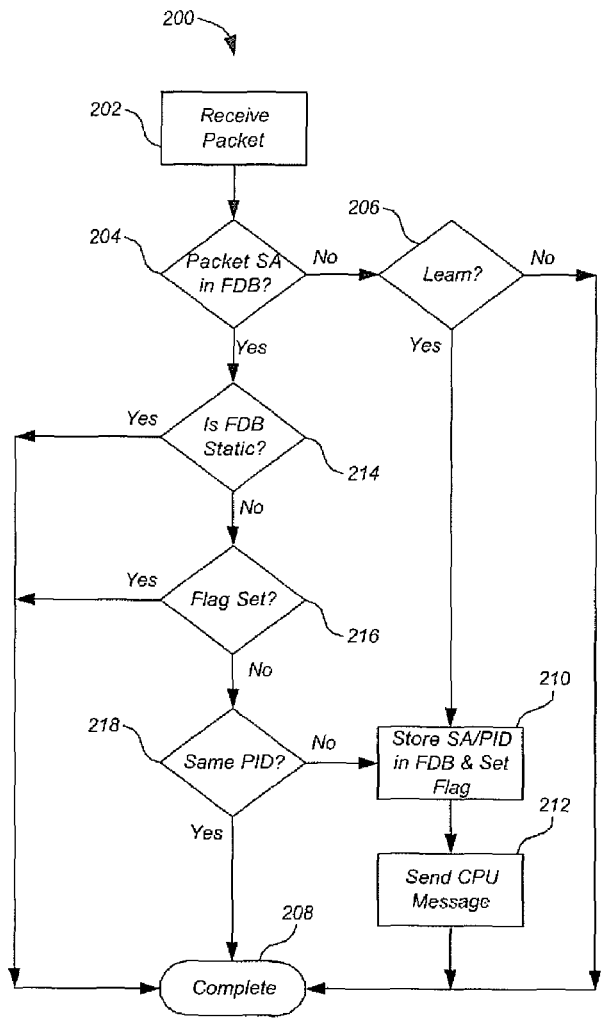
FIG. 2 shows a learning process for the controller of the switch of FIG. 1 according to a preferred embodiment of the present invention.

FIG. 2 shows a learning process 200 for the controller 112 of the switch 102 of FIG. 1 according to a preferred embodiment of the present invention. Learning process 200 begins when switch 102 receives a packet on one of network ports 114 (step 202). Controller 112 determines whether an association exists between the source MAC address of the packet and any of the network ports 114 (step 204), preferably by searching FDB 110 for an entry comprising the source MAC address.

If there is no entry in the FDB for the source MAC address of the packet, controller 112 determines whether learning is enabled for switch 102 (step 206). If learning is disabled, process 200 is complete (step 208). However, if learning is enabled, controller 112 creates an unapproved association, preferably by storing an entry in FDB 110 that comprises the source MAC address of the packet and the port identifier (PID) of the network port 114 on which the packet was received, and by setting an approval flag for the entry (step 210). Controller 112 also sends a notification message to CPU 104 that requests approval for the association (step 212). Then process 200 is complete (step 208).

However, if an association exists for the source MAC address (step 204), controller 112 determines whether FDB 110 is static (Step 214). If FDB 110 is static, process 200 is complete (step 208). But if FDB 110 is not static, controller 112 determines whether the association is approved, preferably by determining whether the approval flag is set for the association's FDB entry (step 216). If the approval flag is set, indicating that a notification message was sent to CPU 104 but no reply has been received, then process 200 is complete (step 208).

However, if the approval flag is clear (that is, not set), indicating that the entry has been approved by CPU 104 (step 216), then controller 112 determines whether the packet was received from the network port indicated in the association, preferably by comparing the port identifier (PID) in the FDB entry to the PID of the network port on which the packet was received (step 218). If the PIDs are the same, then process 200 is complete (step 208).

But if the PIDs differ (step 218), switch 102 must learn the new association. Therefore, controller 112 creates an unapproved association, preferably by storing an entry in FDB 110 that comprises the source MAC address of the packet and the port identifier (PID) of the network port 114 on which the packet was received, and by setting the approval flag for the entry (step 210). Controller 112 also sends a notification message to CPU 104 that requests approval for the association (step 212). Then process 200 is complete (step 208).

Figure 3:
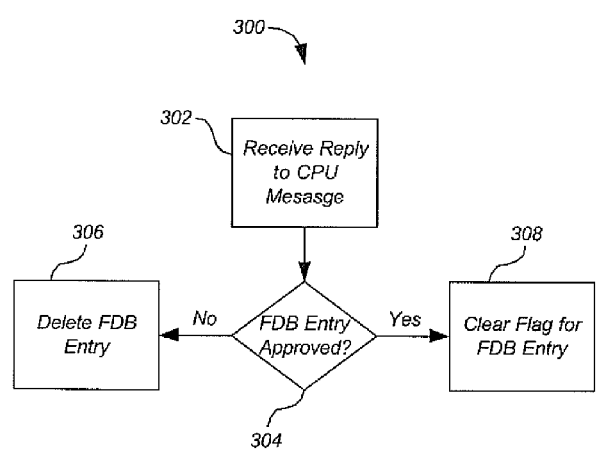
FIG. 3 shows another learning process for the controller of the switch of FIG. 1 according to a preferred embodiment of the present invention.

FIG. 3 shows another learning process 300 for the controller 112 of the switch 102 of FIG. 1 according to a preferred embodiment of the present invention. Learning process 300 begins when switch 102 receives a reply from CPU 104 to a notification message (step 302). Controller 112 determines whether the reply message approves the association for which approval was requested in the notification message (step 304). If the reply message comprises a disapproval of the association, then controller 112 deletes the association, preferably by deleting the FDB entry for the association (step 306).

But if the reply message comprises an approval of the association (step 304), then controller 112 approves the association, preferably by clearing the approval flag for the FDB entry for the association (step 308). Controller 112 may also respond to other instructions in the reply message, for example by changing one or more attributes of the association. Controller 112 can delete associations in other ways as well. For example, controller 112 can delete an association when it reaches a certain age. In some embodiments, controller 112 routinely scrubs FDB 110 to delete associations older than a predetermined age. In such embodiments, CPU 104 need not send a reply message to disapprove an association, instead relying on the scrub process to delete the association.

Figure 4:
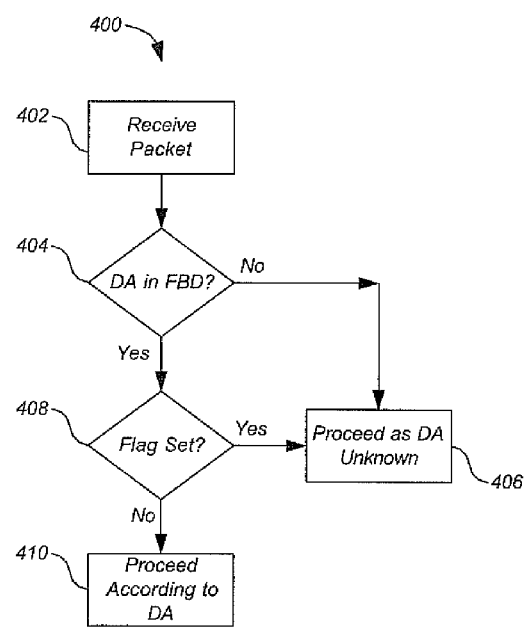
FIG. 4 shows a forwarding process for the controller of the switch of FIG. 1 according to a preferred embodiment of the present invention.

FIG. 4 shows a forwarding process 400 for the controller 112 of the switch 102 of FIG. 1 according to a preferred embodiment of the present invention. Process 400 begins when switch 102 receives a packet (step 402) comprising a destination MAC address. Controller 112 searches FDB 110 for an association for the destination MAC address (step 404). If no association exists for the destination MAC address, then controller 112 proceeds as though the destination MAC address is unknown (step 406). For example, controller 112 can transmit the packet from all of the network ports of the switch except the network port on which the packet was received.

However, if controller 112 finds an association for the destination MAC address in FDB 110 (step 404), controller 112 determines whether the association is approved, preferably by testing the approval flag for the association's FDB entry (step 408). If the approval flag is set, meaning the association is unapproved, then controller 112 proceeds as though the destination MAC address is unknown (step 406).

However, if the approval flag is clear (step 408), then controller 112 proceeds according to the destination MAC address (step 410). For example, controller 112 transmits the packet from the network port 114 that is associated with the destination MAC address in the FDB entry.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A switch comprising:
a plurality of ports comprising a first port and a second port;
a processor configured to approve associations between (i) the plurality of ports and (ii) addresses of packets;
a memory configured to store entries, wherein each of the entries has a respective indicator indicating approval or disapproval of an association between (i) one of the plurality of ports and (ii) one of the addresses of the packets,
wherein the first port is configured to receive a first packet sent to the switch; and
a controller configured to
 determine whether one of the entries includes an address of the first packet,
 if none of the entries includes the address of the first packet, send a first message to the processor requesting approval of the first packet,
 if one of the entries includes the address of the first packet, (i) determine whether the respective indicator of the one of the entries indicates approval, and (ii) based on whether the respective indicator of the one of the entries indicates approval, send the first message to the processor,
 receive a response from the processor based on the first message, and
 based on the response from the processor, forward the first packet to the second port.

2. The switch of claim 1, wherein the controller is configured to send the first message to the processor if the respective indicator of the one of the entries indicates disapproval.

3. The switch of claim 1, wherein the controller is configured to (i) determine whether the one of the entries has a same identifier as an identifier of the first port, and (ii) send the first message to the processor if the identifier in the entry is different than the identifier of the first port.

4. The switch of claim 1, wherein:
the addresses of the packets include at least one of addresses of source devices or addresses of destination devices;
each of the respective indicators indicates approval or disapproval of an association between (i) one of the plurality of ports and (ii) one of the addresses of the source devices or one of the addresses of the destination devices; and
the address of the first packet is a source address or a destination address.

5. The switch of claim 1, wherein the controller is configured to:
determine whether an identifier of the first port is stored with the address of the first packet in the memory; and
send the first message to the processor when the identifier of the first port is not stored with the address of the packet as one of the entries in the memory.

6. The switch of claim 1, wherein the controller is configured to send the first message to the processor when:
no request has been sent to the processor to approve an association between (i) the first port and (ii) the address of the first packet; and
one of the entries has an indicator indicating approval of an association between (i) the address of the first packet and (ii) one of the plurality of ports other than the first port.

7. The switch of claim 1, wherein the controller does not send the first message to the processor when the address of the first packet (i) is stored in the memory and (ii) is not stored with an identifier of the first port as one of the entries in the memory.

8. The switch of claim 1, wherein the controller:
is configured to send the first message to the processor when the memory is not static; and
not send the first message to the processor when the memory is static.

9. The switch of claim 1, wherein:
a third port of the plurality of ports receives a second packet;
the controller is configured to send a second message to the processor requesting approval of an association between (i) the address of the second packet and (ii) the third port; and
the controller is configured to send the second message to the processor based on and subsequent to receiving the response from the processor to the first message.

10. The switch of claim 9, wherein the controller:
is configured to send the second message to the processor when the first message has been approved by the processor; and
does not send the second message to the processor when the first message has not been approved by the processor.

11. The switch of claim 1, wherein:
the controller is configured to send the first message to the processor if an address of a source device is not stored in the memory; and
the first packet is received at the switch from the source device.

12. The switch of claim 1, wherein:
the controller is configured to send the first message to the processor when a port identifier of the first packet is not stored with the address of a source device as one of the entries in the memory; and
the first packet is received at the switch from the source device.

13. A method comprising:
approving, via a processor, associations between (i) a plurality of ports of a switch and (ii) addresses of packets, wherein the plurality of ports comprise a first port and a second port;
storing entries in a memory, wherein each of the entries has a respective indicator indicating approval or disapproval of an association between (i) one of the plurality of ports and (ii) one of the addresses of the packets;
receiving a first packet sent to the switch at the first port;
determining whether one of the entries includes an address of the first packet;
if none of the entries includes the address of the first packet, sending a first message from a controller to the processor requesting approval of the first packet;
if one of the entries includes the address of the first packet, (i) determine whether the respective indicator of the one of the entries indicates approval, and (ii) based on whether the respective indicator of the one of the entries indicates approval, sending the first message from the controller to the processor;
receiving a response from the processor based on the first message; and
based on the response from the processor, forwarding the first packet to the second port.

14. The method of claim 13, wherein the first message is sent from the controller to the processor if the respective indicator of the one of the entries indicates disapproval.

15. The method of claim 13, further comprising determining whether the one of the entries has a same identifier as an identifier of the first port,
   wherein the first message is sent to the processor if the identifier in the entry is different than the identifier of the first port.

16. The method of claim 13, wherein:
   the addresses of the packets include at least one of addresses of source devices or addresses of destination devices;
   each of the respective indicators indicates approval or disapproval of an association between (i) one of the plurality of ports and (ii) one of the addresses of the source devices or one of the addresses of the destination devices; and
   the address of the first packet is a source address or a destination address.

17. The method of claim 13, further comprising determining whether an identifier of the first port is stored with the address of the first packet in the memory,
   wherein the first message is sent from the controller to the processor when the identifier of the first port is not stored with the address of the packet as one of the entries in the memory.

18. The method of claim 13, wherein the first message is sent from the controller to the processor when:
   no request has been sent to the processor to approve an association between (i) the first port and (ii) the address of the first packet; and
   one of the entries has an indicator indicating approval of an association between (i) the address of the first packet and (ii) one of the plurality of ports other than the first port.

19. The method of claim 13, wherein the first message is not sent from the controller to the processor when the address of the first packet (i) is stored in the memory and (ii) is not stored with an identifier of the first port as one of the entries in the memory.

20. The method of claim 13, wherein:
   the first message is sent from the controller to the processor when the memory is not static; and
   the first message is not sent from the controller to the processor when the memory is static.

21. The method of claim 13, further comprising:
   receiving a second packet at a third port of the plurality of ports; and
   sending a second message from the controller to the processor requesting approval of an association between (i) the address of the second packet and (ii) the third port,
   wherein the second message is sent from the controller to the processor based on and subsequent to receiving the response from the processor to the first message.

22. The method of claim 21, wherein:
   the second message is sent from the controller to the processor when the first message has been approved by the processor; and
   the second message is not sent from the controller to the processor when the first message has not been approved by the processor.

* * * * *